United States Patent
Grooteboer et al.

(10) Patent No.: US 8,771,838 B2
(45) Date of Patent: Jul. 8, 2014

(54) SLIDING BEARING ELEMENT COMPRISING A LEAD-FREE ALUMINUM BEARING METAL LAYER

(75) Inventors: Thomas Grooteboer, Essenheim (DE); Karl-Heinz Lindner, Mülheim (DE); Karl-Heinz Lebien, Oestrich-Winkel (DE)

(73) Assignee: Federal-Mogul Wiesbaden GmbH, Wiesbaden (DE)

(*) Notice: Subject to any disclaimer, the term of this patent is extended or adjusted under 35 U.S.C. 154(b) by 322 days.

(21) Appl. No.: 13/266,887

(22) PCT Filed: Apr. 26, 2010

(86) PCT No.: PCT/EP2010/055530
§ 371 (c)(1),
(2), (4) Date: Jan. 25, 2012

(87) PCT Pub. No.: WO2010/125026
PCT Pub. Date: Nov. 4, 2010

(65) Prior Publication Data
US 2012/0114273 A1 May 10, 2012

(30) Foreign Application Priority Data
Apr. 28, 2009 (DE) .................. 10 2009 002 700

(51) Int. Cl.
*F16C 33/12* (2006.01)
*B32B 15/20* (2006.01)
*C22C 21/16* (2006.01)

(52) U.S. Cl.
CPC ............ *F16C 33/121* (2013.01); *F16C 33/127* (2013.01); *B32B 15/20* (2013.01); *C22C 21/16* (2013.01); *Y10S 384/912* (2013.01)
USPC ............................ 428/654; 428/653; 384/912

(58) Field of Classification Search
None
See application file for complete search history.

(56) References Cited

U.S. PATENT DOCUMENTS

| | | | | |
|---|---|---|---|---|
| 5,112,416 A | * | 5/1992 | Tanaka et al. ................. | 148/437 |
| 5,362,574 A | * | 11/1994 | Tanaka et al. ................. | 428/643 |
| 5,384,205 A | * | 1/1995 | Tanaka et al. ................. | 428/643 |
| 5,470,666 A | | 11/1995 | Tanaka et al. | |
| 5,601,371 A | * | 2/1997 | Koroschetz et al. .......... | 384/276 |
| 6,403,230 B1 | * | 6/2002 | Keener .......................... | 428/460 |
| 2004/0247932 A1 | * | 12/2004 | Kagohara et al. .............. | 428/650 |
| 2009/0245702 A1 | * | 10/2009 | Kagohara et al. .............. | 384/42 |

FOREIGN PATENT DOCUMENTS

| | | |
|---|---|---|
| CH | 340 777 A | 8/1959 |
| DE | 1191114 B | 4/1965 |
| DE | 10149675 A1 | 5/2002 |

(Continued)

OTHER PUBLICATIONS

Indentation Hardness, Wikipedia, Apr. 17, 2014.*

*Primary Examiner* — John J Zimmerman
(74) *Attorney, Agent, or Firm* — Robert L. Stearns; Dickinson Wright, PLLC

(57) ABSTRACT

The invention relates to a sliding bearing element comprising a supporting layer, an aluminum alloy-based intermediate layer, and an aluminum alloy-based bearing metal layer. The aluminum alloy composition of the intermediate layer includes at least the following components in percent by weight: 3.5 to 4.5 of copper; 0.1 to 1.5% of manganese; 0.1 to 1.5% of magnesium; and 0.1 to 1.0% of silicon.

16 Claims, 4 Drawing Sheets

(56) References Cited

FOREIGN PATENT DOCUMENTS

Figure 1:
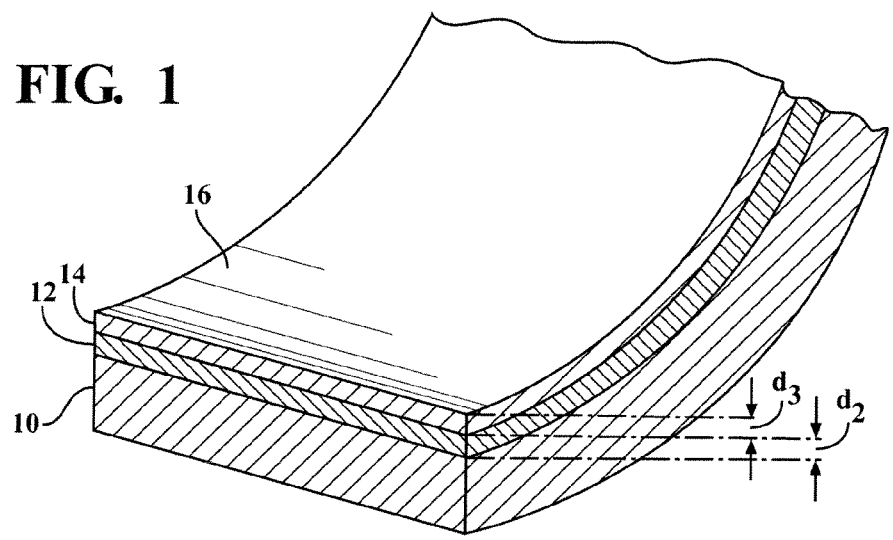

| | | | |
|---|---|---|---|
| EP | 0672840 | A2 | 1/1995 |
| EP | 1522750 | A1 | 10/2003 |
| FR | 523853 | A | 8/1921 |
| GB | 596260 | A | 12/1947 |
| GB | 708472 | A | 5/1954 |
| GB | 1 016 069 | A | 1/1966 |

* cited by examiner

SLIDING BEARING ELEMENT COMPRISING A LEAD-FREE ALUMINUM BEARING METAL LAYER

BACKGROUND OF THE INVENTION

1. Technical Field

The invention relates to a plain bearing element having a support layer, a preferably lead-free intermediate layer based on an aluminum alloy, and a preferably lead-free bearing metal layer based on an aluminum alloy.

2. Related Art

Such bearings are the subject of numerous documents. For example, reference is made to unexamined German applications EP 0 672 840 A2, EP 1 522 750 A1 or U.S. Pat. No. 5,470,660. The plain bearing element in the form of a bearing shell has a support shell made of steel on which a foil-like bearing metal layer or antifriction layer is applied by roll plating. Since the aluminum-based bearing metal layer that generally contains a high amount of tin cannot be plated to the steel support layer with sufficient adhesion, the bearing metal layer is initially plated with an intermediate layer by means of roll plating to form a foil laminate. Initially, an intermediate layer of pure aluminum was used that enables strong adhesion to the steel support layer. This foil laminate is then applied to the steel protective layer in several rolling steps with or without intermediate heat treatment while reducing the thickness of the layers. The finished laminate is then processed by being stamped or cut into plates and, depending on the finished product, processed into a radial bearing by bending or roll forming.

The aforementioned documents are based on the knowledge that the adhesion of the aluminum-based bearing metal layer to the steel support layer can be improved, yet the material properties of the pure aluminum intermediate layer do not ensure that the laminate has sufficient fatigue strength during operation. Consequently, EP 0 672 840 A2 proposes forming an intermediate layer based on a hardenable aluminum alloy, possibly with safety running features instead of pure aluminum foil. The hardness of the intermediate layer formed in this manner is adjusted to a value of approximately 68 HV 0.5 and is therefore higher than the hardness of the anti-friction layer that is approximately 35 to 40 HV 0.5. The hardness which decreases in the direction of the bearing metal layer or antifriction layer is intended to have a positive effect on the fatigue strength and hence on the durability and the life of the plain bearing.

U.S. Pat. No. 5,470,666 arrives at a similar result. In this case as well, the hardness increases from the plain bearing layer over the intermediate layer to the metal support layer, and the hardness of the intermediate layer is adjusted to lie between 25 HV and 60 HV. The thickness of the intermediate layer is 50 to 90% of the overall thickness of the bearing metal layer and the intermediate layer. The intermediate layer is therefore at least as thick or significantly thicker than the bearing metal layer. The intermediate layer is formed of an aluminum alloy with a total of 0.3 to 5 weight percent of alloy components selected from the group consisting of Mn, Cu, Zn, Si, Mg and Fe. The upper limit of the intermediate layer hardness of 60 HV is determined by the formability that is required to compensate for edge bearing, that is, an unavoidable misalignment between the shaft and bearing axis.

SUMMARY OF THE INVENTION

The inventors have, however, found that deformation in the intermediate layer arises with the known bearings under high, specific loads during operation that is enough to displace the intermediate layer material in an axial direction. The intermediate layer is more or less pressed axially out of the end faces of the intermediate bearing shells. This phenomenon is schematically portrayed in FIG. 2. An axial section of the plain bearing shell according to the prior art is in the primary load area (for example close to its crest), A steel support layer 20 is on its radial exterior on top of which is an aluminum-based intermediate layer 22, on top of which is a bearing metal layer 24. Due to the high specific loads arising in particular in the main load area, the intermediate layer 22 begins to flow in an axial direction (similar to roll plating) and is pressed out of the bearing beyond the axial end face 26 of the steel support layer 20. The bearing metal layer 24 is partially squeezed out of the bearing along with the intermediate layer 22. The bearing metal and the connection between the bearing metal and support layer remains undamaged and does not manifest any functional failure. However, close to the end face 26, cracks 28 are discernible between the steel support layer 20 and the intermediate layer 22. In conjunction with the squeezed out material of the bearing metal layer and intermediate layer, these enhance the risk of release and hence a total failure of the bearing as operation continues.

An object of the invention is therefore to improve the laminate having a bearing metal layer and an intermediate layer, both based on an aluminum alloy, and the steel support layer to largely avoid plastic material deformation in the above-described manner.

The plain bearing element according to the invention that in particular is designed in the form of a bearing shell with a support layer, an intermediate layer based on an aluminum alloy and a bearing metal layer based on an aluminum alloy, is characterized in that the aluminum alloy of the intermediate layer has a composition comprising at least the components of 3.5 weight % to 4.5 weight % copper, 0.1 weight % to 1.5 weight % manganese, and 0.1 weight % to 1.5 weight % magnesium.

In particular given the high amount of copper, the hardness of the intermediate layer can be adjusted without sacrificing the strength of the bond with the support layer preferably made of steel. The hardness is adjusted during a roll plating process and using suitable heat treatment before and/or during and/or after roller passes.

The thickness $d_2$ of the intermediate layer of the plain bearing element rolled to a final dimension is preferably 30 µm to 250 µm and, depending on the wall thickness of the bearing shell, 50 µm to 250 µm, especially preferably 80 µm to 175 µm, and most preferably 150 µm to 175 µm.

The inventors have found that an intermediate layer of this thickness with the aforementioned composition having a comparably high hardness is suitable on the one hand to achieve sufficient plastic compliance and hence sufficient formability. On the other hand, a high, adjustable hardness in conjunction with the comparably thick intermediate layer can ensure that the intermediate layer material is only slightly pressed out of the laminate despite plastic deformation.

The intermediate layer therefore preferably has a microhardness of 70 HV 0.01 to 110 HV 0.01, and particularly preferably 85 HV 0.01 to 100 HV 0.01.

The Vickers hardness test of the intermediate layer of the finished (shaped) plain bearing elements follows the European standard EN 6507-1. The test tip (of the penetrating body) is pressed into the intermediate layer in the plane direction in the area of a prepared cut edge of the plain bearing element. The cut edge is preferably prepared by being ground.

The aluminum alloy of the intermediate layer preferably has 0.1 to 1.0 weight % silicon. This increases the strength of the aluminum alloy.

The aluminum alloy of the intermediate layer also preferably has (in weight %): Iron 0.05% to 1.0%, chromium and 0.05% to 0.5%, and zinc 0.05% to 0.5%.

Most preferably, the aluminum alloy of the intermediate later has (in weight %): Manganese 0.4% to 1.0%, magnesium 0.4% to 1.0%, and silicon 0.2% to 0.8%. All of these alloy elements are for increasing the strength and hardness of the material.

It is also advantageous when the aluminum alloy of the inter mediate layer has a total of 0.05 to 0.25% zirconium and titanium (in weight %).

In particular, the aluminum alloy of the intermediate layer advantageously does not have more than 0.1 weight %, and a total of 0.25 weight %, of other alloy components than the aforementioned.

The thickness $d_3$ of the bearing metal layer of the plain bearing element is preferably 150 µm to 400 µm, and especially preferably 200 µm to 400 µm.

The bearing metal layer preferably has an aluminum alloy with 1.0-3 weight % nickel, 0.5-2.5 weight % manganese, 0.02-1.5 weight % copper, a soft phase component of 5-20 weight %, the usual permissible impurities, with the rest being aluminum. The soft phase component is especially preferably 8-12 weight % with reference to the entire aluminum alloy. For example, an AlSn11.5 Ni1.5 Cu0.6 mN0.6 alloy is suitable for the bearing metal layer.

Tin and/or bismuth are preferable as the soft metal components of the bearing metal layer.

The Brinell hardness of the bearing metal layer, especially in one of the aforementioned compositions, is preferably adjusted to 50-70 HBW 1/5/30, and especially preferably 50-60 HBW 1/5/30.

Between the intermediate layer and the bearing metal layer and/or between the intermediate layer and the support layer, there is preferably a roll plating bond.

THE DRAWINGS

Figure 2:
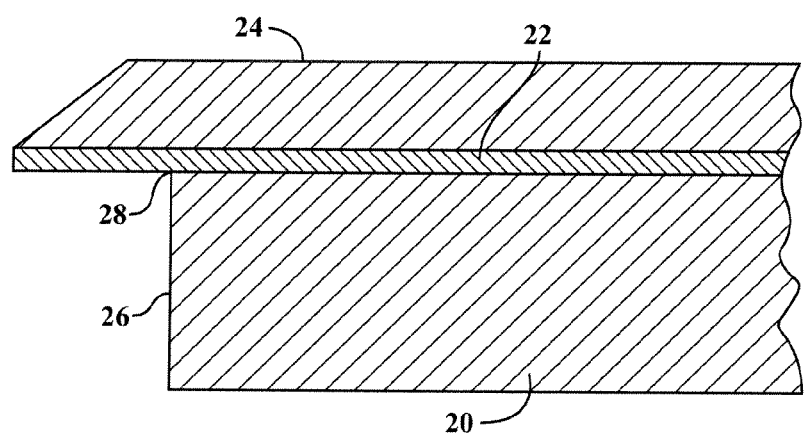
Figure 3:
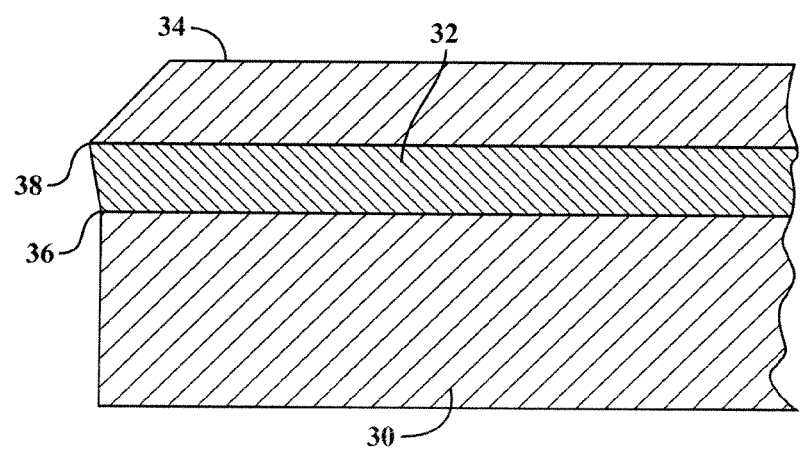
Figure 4:
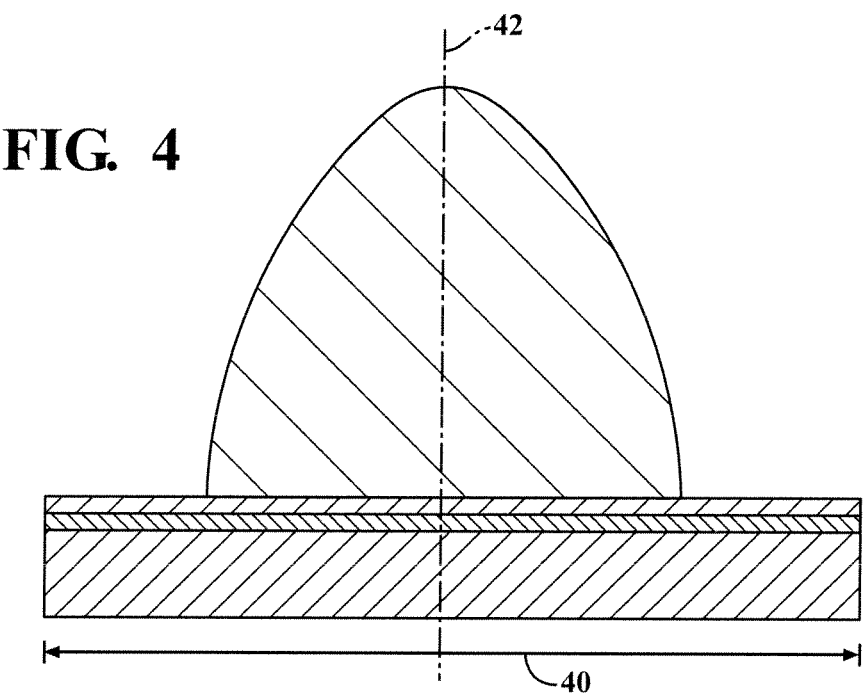
Figure 5:
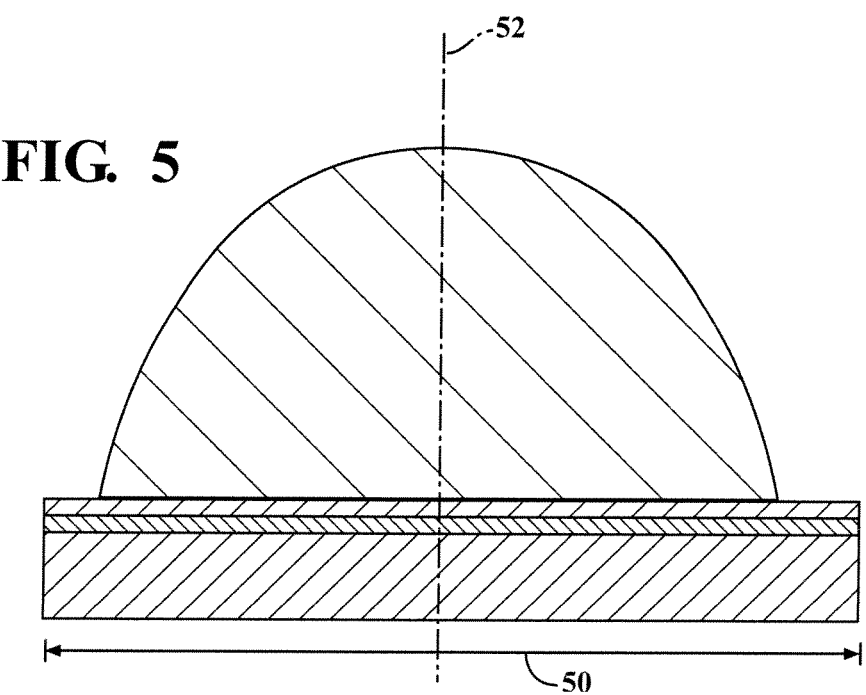
Figure 6:
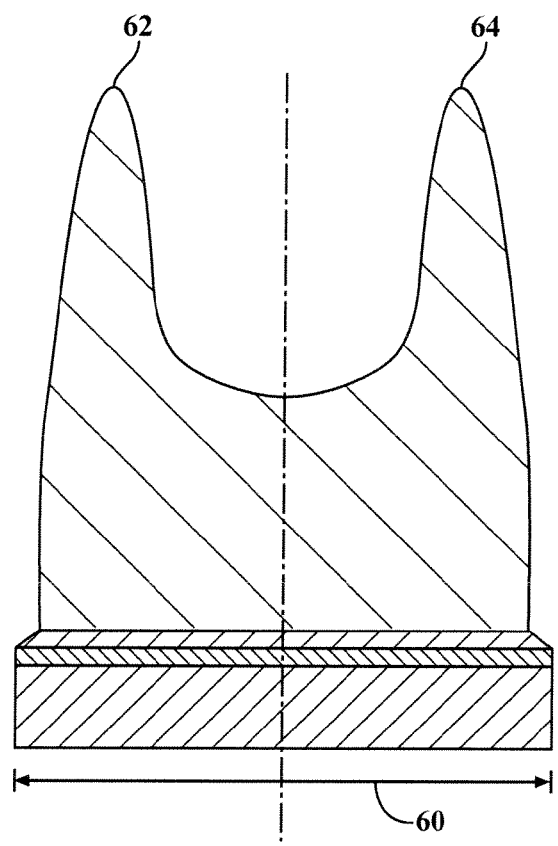
Figure 7:
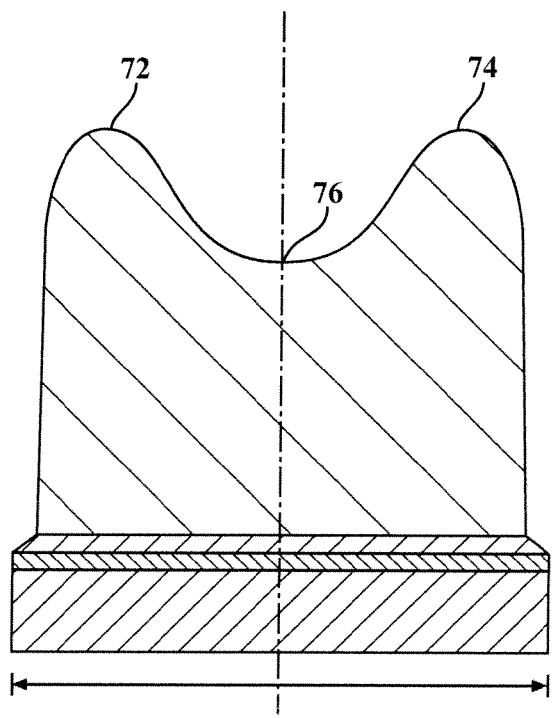
Figure 8:
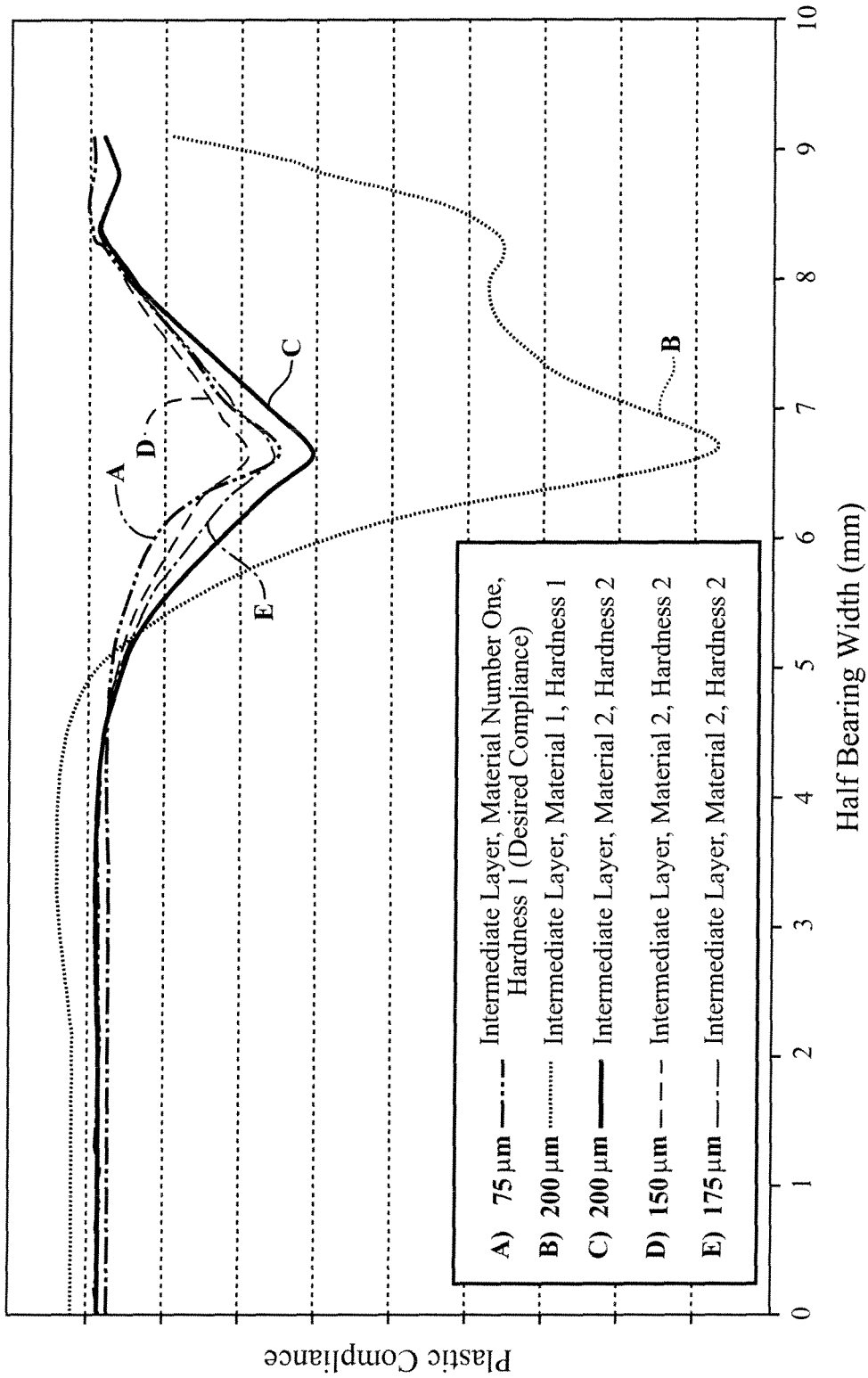

Additional objects, features and advantages will be further explained in the following with reference to an exemplary embodiment using the drawings. The following are shown:

FIG. 1 A perspective section of an exemplary embodiment of the plain bearing element according to the invention in the form of a bearing shell;

FIG. 2 An axial cross section in the crest area of a bearing shell according to the prior art after experiencing a load;

FIG. 3 An axial cross section in the crest area of a bearing shell according to the invention after experiencing a load;

FIG. 4 A curve of the pressure profile in the peripheral direction along a loaded bearing shell during first use;

FIG. 5 The pressure profile curve in a peripheral direction along the bearing shell under the same load as in FIG. 4, but after plastic deformation;

FIG. 6 The pressure profile curve in an axial direction in the area of maximum load on the bearing shell during first use;

FIG. 7 The pressure profile curve in an axial direction in the area of maximum load of the bearing shell after plastic deformation, and FIG. 8 The plastic compliance of an exemplary embodiment of the bearing shall according to the invention in the area of maximum load in hand axial direction depending on the material or hardness and thickness of the intermediate layer.

DETAILED DESCRIPTION

FIG. 1 shows the basic design of a bearing shell according to the invention having a support layer 10 that preferably consists of steel. An intermediate layer 12 and a bearing metal layer 14 are plated in this sequence onto the support layer 10. The bearing surface 16 is formed on the inside of the bearing metal layer 14 and that is in direct sliding contact with a counterrotating element such as a shaft (not shown). The shaft lies (directly) on the bearing surface 16 and exerts radial pressure on the plain bearing element. The plain bearing element is typically lubricated with oil so that an oil film builds up between the shaft and the bearing surface under hydrodynamic pressure due to the rotation of the shaft, and this prevents the shaft and bearing layer from directly contacting.

For production reasons, the intermediate layer 12 and the bearing metal layer 14 can be plated beforehand into a two-layer laminate both they are plated onto the steel support layer 10. After being plated onto the steel support layer 10, the thickness $d$, of the inter mediate layer of the plain bearing element according to the invention is 50 µm to 250 µm, and preferably 150 µm to 175 µm. The thickness $d_3$ of the bearing metal layer is 200 µm to 400 µm and preferably 250 µm to 350 µm.

FIG. 3 shows a section in the axial direction in the peripheral area of the greatest load on a plain bearing element according to the invention after being subject to a typical load. In comparison with FIG. 2, one can see that both the intermediate layer 32 plated directly onto the steel support layer 30 as well as the bearing metal layer 34 plated onto the intermediate layer 32 were only slightly squeezed out of the plain bearing element in an axial direction. Both the roll plating bond 36 between the steel support later 30 and the intermediate layer 32 as well as the roll plating bond 38 ideally remain intact so that, in comparison to the known bearing in FIG. 2, a substantial reduction is anticipated of the risk of the layers releasing along with the total failure of the bearing under the same load.

FIG. 4 shows the pressure profile in an initial typical load situation of a new, i.e., not plastically deformed, radial bearing element in a peripheral direction indicated by arrow 40. An axial section of the same bearing in the same situation is shown in FIG. 6, i.e., along the width of the bearing (arrow 60) in the peripheral area of the largest load. In FIG. 4, one can see a significant maximum pressure in the area of the crest identified by the dot-dashed line 42. The pressure is distributed over a comparatively narrow angular range in the peripheral direction. The pressure is distributed unevenly in the direction of the bearing width 60 such that two significant maximum pressures 62, 64 arise in the axial end areas (see FIG. 6). These reflect so-called edge bearings that are caused by a load-related sag in the counterrotating elements (the shaft or the shaft journal) and/or by load-related deformation of the bearing housing. The high specific loads represented by the pressure peaks cause premature material fatigue and finally premature total failure of the plain bearing.

To improve the durability of the plain bearing, the intermediate layer is designed according to the invention so that it possesses sufficient plastic deformability that reduces the pressure peaks after a certain run-in phase. This state is shown in FIGS. 5 and 7. In direct comparison with FIG. 4, one can see in FIG. 5 that, after the run-in phase, the pressure is distributed over a longer peripheral section, and the maximum pressure is less at the crest 42. Due to the deformability of the intermediate layer under an operating load, the oil film pressure is redistributed, as it were, in the gap between shaft and the plain bearing element. This effect can be seen even more strongly along the width of the bearing in FIG. 7. The bearing is plastically deformed in the axial end sections such that a part of the pressure is redistributed to the axial middle area. The maximum pressures 72 and 74 are flattened to the benefit of an increase the pressure in the area of the minimum 76. Overall, the specific bearing load is the same, but there are no areas with a dangerously excessive specific load, and the anticipated fatigue of the bearing material is after a much longer exposure to a load.

FIG. 8 shows the plastic compliance, i.e., the deformability of plain bearing elements according to the invention in comparison with known plain bearing elements in the direction of the (half) bearing width. The curve is shown starting from the middle of the plain bearing at 0 in an axial direction up to the axial end of the plain bearing at 9. The thick, continuous line "A" indicates the plastic compliance of a laminate according to the prior art based on a 75 mm thick intermediate layer consisting of an Al—Mn1-Cu alloy (EN AW-3003) with a hardness of 60 HV 0.01. Such a layer has the necessary compliance for improving the long-term strength as mentioned at the beginning. However, when this intermediate layer material is used, one observes that it is squeezed out as explained with reference to FIG. 2. Just increasing the thickness of the intermediate layer with the same material yields excessively high plastic compliance as the thick dotted line "B" shows with a significant minimum of approximately 6.7. Increasing the thickness of the inteiinediate layer by itself does not prevent the inteiinediate layer material from squeezing out of the laminate.

The latter is only achieved by using an aluminum alloy for the intermediate layer having 3.5 weight % to 4.5 weight % copper, and after roll plating and possibly heating to a microhardness of 70 to 110 HV 0.01 and preferably 85 to 100 HV 0.01. Plain bearing elements having this intermediate layer material and difference intermediate layer thicknesses were investigated, and an intermediate layer thickness between 50 μm and 250 μm proved to be quite suitable for achieving the desired plastic compliance. Particularly preferable are immediate layer thicknesses between 150 μm (see line "D") and 200 μm (see line "C"), and most preferably between 150 μm and 175 μm (see line "E").

The invention claimed is:

1. A plain bearing element having a support layer, an intermediate layer based on an aluminum alloy and a bearing metal layer based on an aluminum alloy wherein:
the aluminum alloy of the intermediate layer includes (in weight %):

| | |
|---|---|
| Copper | 3.5% to 4.5%, |
| Manganese | 0.1% to 1.5% |
| Magnesium | 0.1% to 1.5%. | and wherein the intermediate layer has a microhardness of 70 HV 0.01 to 110 HV 0.01.

2. The plain bearing element according to claim 1, wherein the intermediate layer has a thickness, $d_2$ of 30 μm to 250 μm.

3. The plain bearing element according to claim 1, wherein the intermediate layer has a thickness, $d_2$ of 80 μm to 175 μm.

4. The plain bearing element according to claim 1 wherein the intermediate layer includes 0.1% to 1.0% silicon in weight percent.

5. The plain bearing element according to claim 1 wherein the aluminum alloy of the intermediate layer further includes (in weight percent):

| | |
|---|---|
| iron | 0.05% to 1.0%, |
| chromium | 0.05% to 0.5%, |
| zinc | 0.05% to 0.5%. |

6. The plain bearing element according to claim 1 wherein the aluminum alloy of the intermediate layer includes (in weight percent):

| | |
|---|---|
| manganese | 0.4% to 1.0%, |
| magnesium | 0.4% to 1.0% |
| silicon | 0.2% to 0.8%. |

7. The plain bearing element according to claim 1, wherein the aluminum alloy of the intermediate layer includes a combined total of 0.05 to 0.25% zirconium and titanium (in weight %).

8. The plain bearing element according to claim 1 wherein the aluminum alloy of the intermediate layer has individually not more than 0.1 weight % and total of not more than 0.25 weight % of other alloy components.

9. The plain bearing element according to claim 1 wherein the thickness $d_3$ of the bearing metal layer is 150 μm to 400 μm.

10. The plain bearing element according to claim 1 wherein the bearing metal layer has an aluminum alloy with 1.0-3 weight % nickel, 0.5-2.5 weight % manganese, 0.02-1.5 weight % copper, a soft phase component of 5-20 weight %, permissible impurities, with the rest being aluminum.

11. The plain bearing element according to claim 10, wherein the soft phase component of the bearing metal layer comprises tin and/or bismuth.

12. The plain bearing element according to claim 10 wherein the soft phase component in the bearing metal layer (14, 24, 34) is 8-12 weight %.

13. The plain bearing element according to claim 1 wherein the bearing metal layer has a Brinell hardness of 50-70 HBW 1/5/30.

14. The plain bearing element according to claim 1 including a roll plating bond between the intermediate layer and the bearing metal layer.

15. The plain bearing element according to claim 1 including a roll plating bond between the intermediate layer and the support layer.

16. The plain bearing element according to claim 1 wherein the plain bearing element is a bearing shell.

* * * * *